United States Patent
Du et al.

(10) Patent No.: US 9,736,391 B2
(45) Date of Patent: Aug. 15, 2017

(54) PHOTOGRAPHING METHOD OF DUAL-LENS DEVICE, AND DUAL-LENS DEVICE

(71) Applicant: Huawei Device Co., Ltd., Shenzhen (CN)

(72) Inventors: Cheng Du, Beijing (CN); Bin Deng, Shenzhen (CN); Wei Luo, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 15/101,719

(22) PCT Filed: Dec. 6, 2013

(86) PCT No.: PCT/CN2013/088758
§ 371 (c)(1),
(2) Date: Jun. 3, 2016

(87) PCT Pub. No.: WO2015/081556
PCT Pub. Date: Jun. 11, 2015

(65) Prior Publication Data
US 2017/0006208 A1    Jan. 5, 2017

(51) Int. Cl.
*H04N 5/235* (2006.01)
*G03B 17/00* (2006.01)
(Continued)

(52) U.S. Cl.
CPC ........... *H04N 5/2357* (2013.01); *G03B 15/00* (2013.01); *G03B 17/00* (2013.01); *H04N 5/2258* (2013.01);
(Continued)

(58) Field of Classification Search
CPC .............. H04N 5/2258; H04N 5/235–5/243
See application file for complete search history.

(56) References Cited

U.S. PATENT DOCUMENTS

| 6,101,333 A | 8/2000 | Bullitt et al. |
| 8,244,402 B2 | 8/2012 | Wells et al. |

(Continued)

FOREIGN PATENT DOCUMENTS

| CN | 101489115 A | 7/2009 |
| CN | 101632296 A | 1/2010 |

(Continued)

OTHER PUBLICATIONS

Han, X.H. et al., "Multi-class Co-training Learning for Object and Scene Recognition," MVA2011 Conference on Machine Vision Applications, Jun. 13-15, 2011, 4 pages.

*Primary Examiner* — Paul Berardesca
(74) *Attorney, Agent, or Firm* — Slater Matsil, LLP

(57) ABSTRACT

The present invention provides a photographing method for a dual-lens device. The dual-lens device includes a first lens and a second lens that are arranged on a same plane. The photographing method includes acquiring a first image collected by a first image sensor; identifying a scenario of the first image to determine a photographing environment, determining a second image signal processor (ISP) parameter corresponding to the second lens; acquiring a second image that is collected, according to the second ISP parameter, and generating a preview image. According to the present invention, a photographing environment is determined by using an image collected by one lens of the dual-lens device, and then a preview image is generated by using an image collected by the other lens.

20 Claims, 3 Drawing Sheets

(51) Int. Cl.
*G03B 15/00* (2006.01)
*H04N 5/225* (2006.01)

(52) U.S. Cl.
CPC ......... *H04N 5/2351* (2013.01); *H04N 5/2353* (2013.01)

(56) References Cited

U.S. PATENT DOCUMENTS

| | | |
|---|---|---|
| 2005/0105776 A1 | 5/2005 | Luo et al. |
| 2008/0111913 A1 | 5/2008 | Okamoto |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0231726 A1 | 9/2008 | John |
| 2010/0277619 A1 | 11/2010 | Scarff |
| 2014/0340566 A1* | 11/2014 | Voss .................. H04N 5/23212 348/349 |

FOREIGN PATENT DOCUMENTS

| | | |
|---|---|---|
| CN | 101637019 A | 1/2010 |
| CN | 101902572 A | 12/2010 |
| CN | 101958976 A | 1/2011 |
| CN | 202395858 U | 8/2012 |
| EP | 2306367 A1 | 4/2011 |
| JP | 2004235956 A | 8/2004 |

* cited by examiner

PHOTOGRAPHING METHOD OF DUAL-LENS DEVICE, AND DUAL-LENS DEVICE

CROSS-REFERENCE TO RELATED APPLICATIONS

This patent application is a national phase filing under section 371 of PCT/CN2013/088758, filed Dec. 6, 2013 which is incorporated herein by reference in its entirety.

TECHNICAL FIELD

Embodiments of the present invention relate to the image processing field, and more specifically, to a photographing method of a dual-lens device, and a dual-lens device.

BACKGROUND

With popularity of smart devices, an increasing number of devices are equipped with a camera function. Generally, a single-lens camera is disposed on a rear surface of a device, or another single-lens camera is also disposed on a front surface of the device.

A common camera function includes a preview image function, that is, an image currently acquired by a lens is dynamically displayed on a built-in display of the device or on an external display. For example, when a user is relatively satisfied with a current preview image, the user may press a particular button, for example, a hardware button disposed on the device or a button simulated on a camera application, so as to provide a photographing operation instruction to the device. When the photographing operation instruction is received, the device performs processing on the current preview image and generates a picture.

To improve photographing quality, a conventional single-lens camera may identify a scenario. For example, when a night scene or a backlit scene is detected by using a scenario identification algorithm, the single-lens camera may implement an increase in brightness by prolonging an exposure time or improving film speed, so as to improve a photographing effect. However, after brightness in a night scene or a backlit scene is increased by the single-lens camera, picture flickering on the preview image is likely to be caused. Specifically, after the single-lens camera acquires a new preview image according to a parameter that is obtained after brightness is increased, the single-lens camera determines, according to the new preview image, whether a current photographing environment is still a night scene or a backlit scene. In this case, because brightness of the preview image has already been increased, and the single-lens camera may determine that the current photographing environment is no longer a night scene or a backlit scene, a photographing parameter is restored to a normal value, that is, brightness is decreased; therefore, a next-frame preview image darkens again. Repeated increases and decreases of brightness cause picture flickering on the preview picture.

SUMMARY

Embodiments of the present invention provide a photographing method of a dual-lens device, and a dual-lens device, which can resolve a problem of picture flickering on a preview image of a single-lens camera.

According to a first aspect, a photographing method of a dual-lens device is provided, where the dual-lens device includes a first lens and a second lens that are arranged on a same plane of the dual-lens device, and the photographing method includes: acquiring a first image collected by a first image sensor corresponding to the first lens; identifying a scenario of the first image to determine a photographing environment; determining, according to the photographing environment, a second image signal processor (ISP) parameter corresponding to the second lens; acquiring a second image that is collected, by using the second ISP parameter, by a second image sensor corresponding to the second lens; and generating a preview image according to the second image.

With reference to the first aspect, in a first possible implementation manner, the photographing method further includes: determining a photographing algorithm according to the photographing environment; and performing processing on the preview image by using the photographing algorithm and generating a picture, when a photographing operation instruction is received.

With reference to the first aspect or the first possible implementation manner of the first aspect, in a second possible implementation manner, the identifying a scenario of the first image to determine a photographing environment includes: when a difference between an average value of brightness of a center on the first image and an average value of brightness of surrounding of the first image is greater than a first threshold, adjusting a first ISP parameter corresponding to the first lens, where the adjusting a first ISP parameter corresponding to the first lens includes prolonging an exposure time of the first lens; acquiring a third image that is collected, by using the first ISP parameter, by the first image sensor, where the third image is a next-frame image, after the first ISP parameter is adjusted, of the first image; and determining, according to the first image and the third image, whether the photographing environment is a backlit scene.

With reference to the second possible implementation manner of the first aspect, in a third possible implementation manner, the determining, according to the first image and the third image, whether the photographing environment is a backlit scene includes: when a difference between an average value of brightness of a center on the third image and the average value of brightness of the center on the first image is greater than a second threshold, or when a difference between an average value of color saturation of a center on the third image and an average value of color saturation of the center on the first image is greater than a third threshold, determining that the photographing environment is a backlit scene.

With reference to the first aspect or any one of the foregoing possible implementation manners, in a fourth possible implementation manner, the determining, according to the photographing environment, a second ISP parameter corresponding to the second lens includes: when the photographing environment is a backlit scene, prolonging an exposure time of the second lens and/or improving film speed of the second lens.

With reference to any one of the first possible implementation manner of the first aspect to the fourth possible implementation manner of the first aspect, in a fifth possible implementation manner, the determining a photographing algorithm according to the photographing environment includes: when the photographing environment is a backlit scene, determining the photographing algorithm as a partial contrast ratio algorithm; and the performing processing on the preview image by using the photographing algorithm and generating a picture, when a photographing operation instruction is received includes: when the photographing operation instruction is received, performing processing on the preview image by using the partial contrast ratio algorithm and adjusting a parameter of the partial contrast ratio algorithm, and generating a picture.

With reference to the first aspect or the first possible implementation manner of the first aspect, in a sixth possible implementation manner, the determining, according to the photographing environment, a second ISP parameter corresponding to the second lens includes: when the photographing environment is a night scene, prolonging an exposure time of the second lens and/or improving film speed of the second lens.

With reference to the first possible implementation manner of the first aspect or the sixth possible implementation manner of the first aspect, in a seventh possible implementation manner, the determining a photographing algorithm according to the photographing environment includes: when the photographing environment is a night scene, determining the photographing algorithm as a multiframe denoising algorithm; and the performing processing on the preview image by using the photographing algorithm and generating a picture, when a photographing operation instruction is received includes: when the photographing operation instruction is received, performing processing on the preview image by using the multiframe denoising algorithm, and generating a picture.

With reference to the first aspect, in an eighth possible implementation manner, the photographing method further includes: when the photographing environment is not a negative feedback scenario, acquiring a second image collected by the second image sensor, and using the second image as the preview image; and when a photographing operation instruction is received, generating a picture according to the preview image.

According to the second aspect, a photographing apparatus is provided, where the photographing apparatus includes: a first acquiring unit, configured to acquire a first image collected by a first image sensor corresponding to a first lens; a first determining unit, configured to identify a scenario of the first image acquired by the first acquiring unit to determine a photographing environment; a second determining unit, configured to determine, according to the photographing environment determined by the first determining unit, a second ISP parameter corresponding to a second lens; a second acquiring unit, configured to acquire a second image that is collected, by using the second ISP parameter determined by the second determining unit, by a second image sensor corresponding to the second lens; and a generating unit, configured to generate a preview image according to the second image acquired by the second acquiring unit; where the first lens and the second lens are arranged on a same plane.

With reference to the second aspect, in a first possible implementation manner, the photographing apparatus further includes: a third determining unit, configured to determine a photographing algorithm according to the photographing environment determined by the first determining unit; a receiving unit, configured to receive a photographing operation instruction; and a first executing unit, configured to: when the receiving unit receives the photographing operation instruction, perform processing on the preview image by using the photographing algorithm determined by the third determining unit, and generate a picture.

With reference to the second aspect or the first possible implementation manner of the second aspect, in a second possible implementation manner, the first determining unit includes: an adjusting subunit, configured to: when a difference between an average value of brightness of a center on the first image and an average value of brightness of surrounding of the first image is greater than a first threshold, adjust a first ISP parameter corresponding to the first lens, where the adjusting a first ISP parameter corresponding to the first lens includes prolonging an exposure time of the first lens; an acquiring subunit, configured to acquire a third image that is collected, by using the first ISP parameter, by the first image sensor, where the third image is a next-frame image, after the first ISP parameter is adjusted, of the first image; and a determining subunit, configured to determine, according to the first image acquired by the first acquiring unit and the third image acquired by the acquiring subunit, whether the photographing environment is a backlit scene.

With reference to the second possible implementation manner of the second aspect, in a third possible implementation manner, the determining subunit is specifically configured to: when a difference between an average value of brightness of a center on the third image and the average value of brightness of the center on the first image is greater than a second threshold, or when a difference between an average value of color saturation of a center on the third image and an average value of color saturation of the center on the first image is greater than a third threshold, determine that the photographing environment is a backlit scene.

With reference to the second aspect or any one of the foregoing possible implementation manners of the second aspect, in a fourth possible implementation manner, the second determining unit is configured to: when the photographing environment determined by the first determining unit is a backlit scene, prolong an exposure time of the second lens and/or improve film speed of the second lens.

With reference to any one of the first possible implementation manner of the second aspect to the fourth possible implementation manner of the second aspect, in a fifth possible implementation manner, the third determining unit is configured to: when the photographing environment determined by the first determining unit is a backlit scene, determine the photographing algorithm as a partial contrast ratio algorithm; the receiving unit is configured to receive the photographing operation instruction; and the first executing unit is configured to: when the receiving unit receives the photographing operation instruction, perform processing on the preview image by using the partial contrast ratio algorithm determined by the third determining unit and adjust a parameter of the partial contrast ratio algorithm, and generate a picture.

With reference to the second aspect or the first possible implementation manner of the second aspect, in a sixth possible implementation manner, the second determining unit is configured to: when the photographing environment determined by the first determining unit is a night scene, prolong an exposure time of the second lens and/or improve film speed of the second lens.

With reference to the first possible implementation manner of the second aspect or the sixth possible implementation manner of the second aspect, in a seventh possible implementation manner, the third determining unit is configured to: when the photographing environment determined by the first determining unit is a night scene, determine the photographing algorithm as a multiframe denoising algorithm; the receiving unit is configured to receive the photographing operation instruction; and a first executing unit is configured to: when the receiving unit receives the photographing operation instruction, perform processing on the preview image by using the multiframe denoising algorithm determined by the third determining unit, and generate a picture.

With reference to the second aspect, in an eighth possible implementation manner, the photographing apparatus further includes: a second executing unit, configured to: when the photographing environment determined by the first determining unit is not a negative feedback scenario, acquire a second image collected by the second image sensor, and use the second image as the preview image; and further, when a photographing operation instruction is received, generate a picture according to the preview image.

According to a third aspect, a dual-lens device is provided, where the dual-lens device includes a processor, a display, a first lens and a second lens that are arranged on a same plane of the dual-lens device, a first image sensor corresponding to the first lens, and a second image sensor corresponding to the second lens; where the first image sensor is configured to collect a first image by using the first lens; the second image sensor is configured to collect a second image by using the second lens; the processor is configured to: acquire the first image collected by the first image sensor; identify a scenario of the first image to determine a photographing environment; determine, according to the photographing environment, a second ISP parameter corresponding to the second lens; further acquire a second image that is collected, by using the second ISP parameter, by the second image sensor corresponding to the second lens; and generate a preview image according to the second image; and the display is configured to display the preview image generated by the processor.

With reference to the third aspect, in a first possible implementation manner, the processor is further configured to: determine a photographing algorithm according to the photographing environment; and perform processing on the preview image by using the photographing algorithm and generate a picture, when a photographing operation instruction is received.

With reference to the third aspect or the first possible implementation manner of the second aspect, in a second possible implementation manner, the processor is configured to: when a difference between an average value of brightness of a center on the first image and an average value of brightness of surrounding of the first image is greater than a first threshold, adjust a first ISP parameter corresponding to the first lens, where the adjusting a first ISP parameter corresponding to the first lens includes prolonging an exposure time of the first lens; acquire a third image that is collected, by using the first ISP parameter, by the first image sensor, where the third image is a next-frame image, after the first ISP parameter is adjusted, of the first image; and determine, according to the first image and the third image, whether the photographing environment is a backlit scene.

With reference to the second possible implementation manner of the third aspect, in a third possible implementation manner, the processor is configured to: when a difference between an average value of brightness of a center on the third image and the average value of brightness of the center on the first image is greater than a second threshold, or when a difference between an average value of color saturation of a center on the third image and an average value of color saturation of the center on the first image is greater than a third threshold, determine that the photographing environment is a backlit scene.

With reference to the third aspect or any one of the foregoing possible implementation manners, in a fourth possible implementation manner, the processor is configured to: when the photographing environment is a backlit scene, prolong an exposure time of the second lens and/or improve film speed of the second lens.

With reference to any one of the first possible implementation manner of the third aspect to the fourth possible implementation manner of the third aspect, in a fifth possible implementation manner, the processor is further configured to: when the photographing environment is a backlit scene, determine the photographing algorithm as a partial contrast ratio algorithm; and when the photographing operation instruction is received, perform processing on the preview image by using the partial contrast ratio algorithm and adjust a parameter of the partial contrast ratio algorithm, and generate a picture.

With reference to the third aspect or the first possible implementation manner of the third aspect, in a sixth possible implementation manner, the processor is configured to: when the photographing environment is a night scene, prolong an exposure time of the second lens and/or improve film speed of the second lens.

With reference to the first possible implementation manner of the third aspect or the sixth possible implementation manner of the third aspect, in a seventh possible implementation manner, the processor is further configured to: when the photographing environment is a night scene, determine the photographing algorithm as a multiframe denoising algorithm; and when the photographing operation instruction is received, perform processing on the preview image by using the multiframe denoising algorithm, and generate a picture.

With reference to the third aspect, in an eighth possible implementation manner, the processor is further configured to: when the photographing environment is not a negative feedback scenario, acquire a second image collected by the second image sensor, and use the second image as the preview image; and when a photographing operation instruction is received, generate a picture according to the preview image.

With reference to the third aspect or any one of the foregoing possible implementation manners, in a ninth possible implementation manner, the processor is a first central processing unit (CPU), or the processor is a first image signal processor (ISP).

With reference to the third aspect, in a tenth possible implementation manner, the processor includes a second CPU and a second ISP.

According to the embodiments of the present invention, a photographing environment is determined by using an image collected by one lens of a dual-lens device, an ISP parameter corresponding to the other lens is determined according to the determined photographing environment, and then a preview image is generated by using an image collected by the other lens. In such a manner of using two lenses to respectively determining a photographing environment and acquiring a preview image, picture flickering on the preview image can be avoided.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Currently, after brightness of a night scene or a backlit scene is increased by a single-lens camera, picture flickering is likely to be caused. In addition, it is difficult for the single-lens camera to distinguish between a backlit scene generated by backlight and a non-backlit scene in which a center on the scenario inherently has a large-area black object. In this way, the foregoing non-backlit scene is likely to be detected by mistake as a backlit scene. In this case, image quality of the black object cannot be improved even if an auto-exposure (AE) parameter is adjusted, an exposure time is prolonged, or a numeric value of film speed is increased, which, on the contrary, causes overexposure of a background.

It should be noted that, in the following description, when two components are "connected", the two components may be directly connected, or indirectly connected through one or more intermediate components. A manner of connecting two components may be a contact manner or a non-contact manner. A person skilled in the art may perform equivalent replacement or modification on an exemplary connection manner described in the following; such replacement or modification falls within the scope of the present invention.

Figure 1:
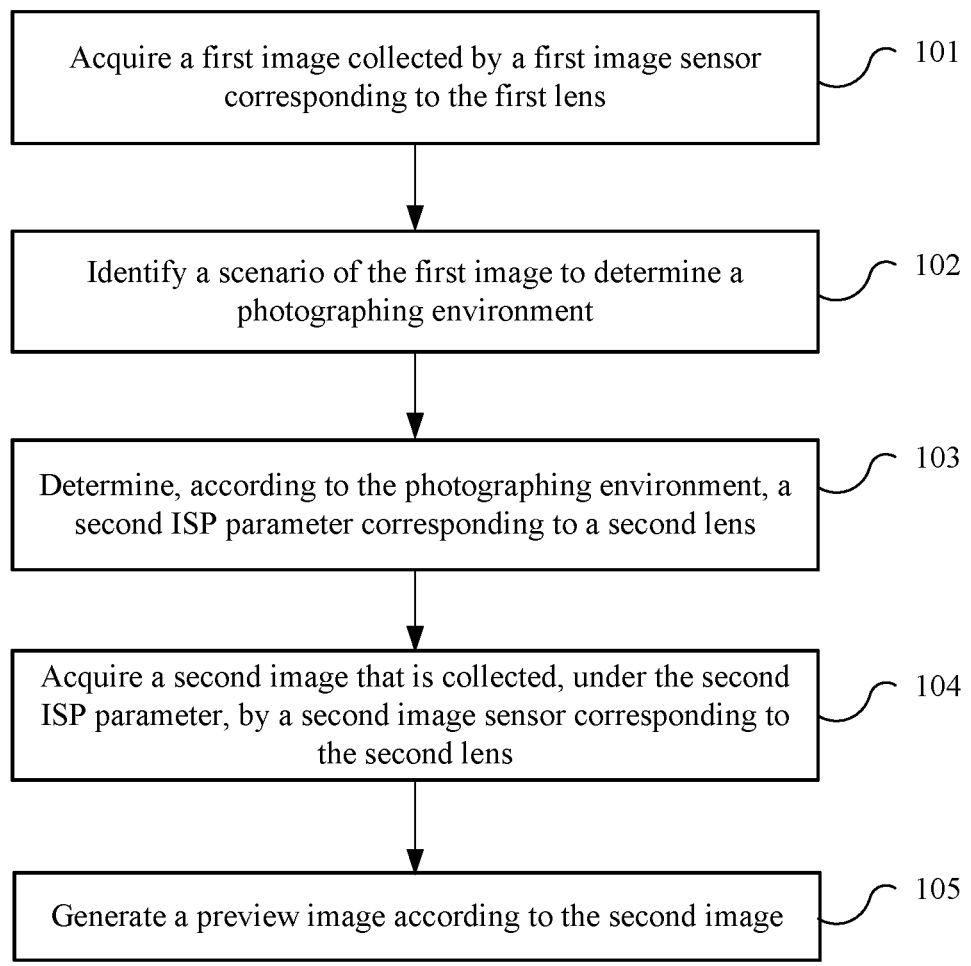
FIG. 1 is a flowchart of a photographing method of a dual-lens device according to an embodiment of the present invention.

FIG. 1 is a flowchart of a photographing method of a dual-lens device according to an embodiment of the present invention. The dual-lens device includes a first lens and a second lens that are arranged on a same plane of the dual-lens device. The photographing method shown in FIG. 1 includes the following steps:

101. Acquire a first image collected by a first image sensor corresponding to the first lens.

102. Identify a scenario of the first image to determine a photographing environment.

103. Determine, according to the photographing environment, a second ISP parameter corresponding to the second lens.

104. Acquire a second image that is collected, by using the second ISP parameter, by a second image sensor corresponding to the second lens.

105. Generate a preview image according to the second image.

According to this embodiment of the present invention, a photographing environment is determined by using an image collected by one lens of a dual-lens device, an ISP parameter corresponding to the other lens is determined according to the determined photographing environment, and then a preview image is generated by using an image collected by the other lens. In such a manner of using two lenses to respectively determining a photographing environment and acquiring a preview image, picture flickering on the preview image can be avoided.

In this embodiment of the present invention, the dual-lens device may be a dual-lens camera installed on a mobile terminal such as a mobile phone or a handheld computer, may be a dual-lens video camera on another fixed device, or may be a dual-lens device in another form, which is not limited in the present invention.

Two lens used in the dual-lens device in this embodiment of the present invention are arranged on a same plane, for example, arranged on a rear surface of the device or arranged on a front surface of the device, or the two lens may be respectively arranged on a front surface and a rear surface; the two lens can be located on a same plane by rotating one lens. In this way, a scenario or an environment at which the two lenses are directed is basically similar, and therefore, a photographing environment may be identified by using one lens, to adjust an ISP parameter corresponding to the other lens.

In this embodiment of the present invention, the ISP parameter includes an exposure time and film speed.

In this embodiment of the present invention, the first lens and the second lens of the dual-lens device may use a same parameter, or may use different parameters, where a parameter may include but is not limited to a focal length parameter, an aperture parameter, and an image stability parameter. In addition, the dual-lens device in this embodiment of the present invention may use the second lens as a main lens, that is, the preview image is collected only by the second lens and the first lens is only for internal processing, which is not limited in the present invention.

In this embodiment of the present invention, the second ISP parameter may be an ISP parameter of an ISP corresponding to the second lens, where the ISP corresponding to the second lens may be used as a separate device or may be integrated in a processor. Quality of an image collected by the second image sensor corresponding to the second lens may be adjusted by adjusting the second ISP parameter. In addition, the film speed of the second lens and the exposure time of the second lens that are mentioned in this embodiment of the present invention refer to film speed of the ISP corresponding to the second lens and an exposure time of the ISP corresponding to the second lens.

Optionally, in an embodiment, a photographing algorithm may further be determined according to the photographing environment; and when a photographing operation instruction is received, processing is performed on the preview image by using the photographing algorithm and a picture is generated.

For example, the preview image in step 105 may be displayed on a display screen of the dual-lens device, which enables a user to perform a photographing operation according to the preview image. It should be noted that, the photographing operation in this embodiment of the present invention may be a photographing operation performed by the user, for example, pressing a particular button; may be a photographing operation preconfigured by the dual-lens device, for example, each photographing operation when automatic photographing is set; or may be a photographing operation in another form, which is not limited in the present invention.

Optionally, in another embodiment, in step 102, when a difference between an average value of brightness of a center on the first image and an average value of brightness of surrounding of the first image is greater than a first threshold, a first ISP parameter corresponding to the first lens may be adjusted, and a third image that is collected, by using the first ISP parameter, by the first image sensor corresponding to the first lens is acquired, where the adjusting a first ISP parameter corresponding to the first lens includes prolonging an exposure time of the first lens, and the third image is a next-frame image, after the first SP parameter is adjusted, of the first image. Then, it may further be determined, according to the first image and the third image, whether the photographing environment is a backlit scene.

Specifically, for example, when a difference between an average value of brightness of a center on the third image and the average value of brightness of the center on the first image is greater than a second threshold, or when a difference between an average value of color saturation of a center on the third image and an average value of color saturation of the center on the first image is greater than a third threshold, it may be determined that the photographing environment is a backlit scene.

Specifically, that a difference between an average value of brightness of a center on the first image and an average value of brightness of surrounding of the first image is greater than a first threshold may be expressed in the following formula (1):

$$YMean_{Center1} - YMean_{Border1} > T_1 \quad (1),$$

where YMean represents an average value of brightness, Center1 represents the center on the first image, Border1 represents the surrounding of the first image, and $T_1$ is the first threshold.

When formula (1) is met, the photographing environment is suspected to be a backlit scene. In this case, the first image may first be stored, then the exposure time of the first lens is appropriately prolonged, and then the next-frame image, that is, the third image, collected by the first image sensor is acquired. Then, a scenario may further be identified according to the first image and the third image, so as to determine whether the photographing environment is a backlit scene.

Specifically, that a difference between an average value of brightness of a center on the third image and the average value of brightness of the center on the first image is greater than a second threshold may be expressed in the following formula (2):

$$YMean_{Center3} - YMean_{Center1} > T_2 \quad (2),$$

where Center3 represents the center on the third image, and $T_2$ is the second threshold. That a difference between an average value of color saturation of a center on the third image and an average value of color saturation of the center on the first image is greater than a third threshold may be expressed in the following formula (3):

$$SMean_{Center3} - SMean_{Center1} > T_3 \quad (3),$$

where SMean represents an average value of color saturation, and $T_3$ is the third threshold. Then, when both formula (1) and formula (2) are met or both formula (1) and formula (3) are met, it may be determined that the photographing environment is a backlit scene. Generally, the backlit scene refers to that during photographing, brightness of a target object is less than brightness of a background, that is, brightness of a foreground is less than brightness of a background.

It should be noted that, in this embodiment of the present invention, positions of the center and the surrounding are not specifically limited. Optionally, the center may be a geometric center of an image. For example, an image may be divided into nine blocks in 3×3, which may also be referred to as a Sudoku. In this case, a block in the center is referred to as a center, and accordingly, other eight surrounding blocks are the surrounding. Optionally, the center may also be an object or a foreground when a user is photographing, and may not be a geometric center of an image. For example, when a user is taking a portrait photo, a human face may be defined as a center by means of human face detection, and accordingly, other areas surrounding the human face is defined as surrounding.

Optionally, in another embodiment, when the photographing environment is a backlit scene, an exposure time of the second lens may be prolonged, and/or film speed of the second lens may be improved. Further, the second image collected by the second image sensor may be acquired, and the second image is used as the preview image, where the second image is an image collected by the second image sensor after the exposure time of the second lens is prolonged and/or the film speed of the second lens is improved.

Optionally, in another embodiment, when the photographing environment is a backlit scene, the photographing algorithm may be determined as a partial contrast ratio algorithm; and when the photographing operation instruction is received, processing may be performed on the preview image by using the partial contrast ratio algorithm and a parameter of the partial contrast ratio algorithm may be adjusted, and a picture is generated. In this way, brightness of details of a foreground can be increased while a background is maintained.

In this way, in this embodiment of the present invention, an image collected by the first image sensor corresponding to the first lens is mainly used to identify a scenario; when a suspected backlit scene is detected, the backlit scene is further determined by appropriately prolonging the exposure time of the first lens and comparing two images that are collected by the first image sensor before and after the exposure time is adjusted. In this way, mistaken detection of a backlit scene can be avoided, for example, a case in which a black object in a center is mistaken as a backlit scene. Further, the second ISP parameter corresponding to a second image lens is determined according to the photographing environment determined by using the first image, then, the second image that is collected, by using the determined second ISP parameter, by the second image sensor is used as the preview image, and the second image sensor does not identify a scenario for the second image collected by the second image sensor. In this way, picture flickering can be avoided.

Optionally, in another embodiment, the scenario of the first image may be identified, and the photographing environment is determined as a night scene. When the photographing environment is a night scene, an exposure time of the second lens may be prolonged and/or film speed of the second lens may be improved. In this way, overall brightness of an image collected by the second image sensor can be increased. Further, the second image collected by the second image sensor may be acquired, and the second image is used as the preview image, where the second image is an image collected by the second image sensor after the exposure time of the second lens is prolonged and/or the film speed of the second lens is improved.

Optionally, in another embodiment, when the photographing environment is a night scene, the photographing algorithm may be determined as a multiframe denoising algorithm; and when the photographing operation instruction is received, processing may be performed on the preview image by using the multiframe denoising algorithm, and a picture is generated. In this way, noise generated because of long-time exposure or high film speed can be lowered while brightness is maintained.

In this way, in this embodiment of the present invention, an image collected by a first image sensor is mainly used to identify a scenario; when it is detected that a photographing environment is a night scene, a second ISP parameter corresponding to a second lens is determined according to the photographing environment, and an image that is collected, by using the determined second ISP parameter, by a second image sensor is used as a preview image, which can avoid picture flickering.

It should be noted that, the method according to this embodiment of the present invention is applied not only to a night scene and a backlit scene, but also applied to another negative feedback scenario, which is not limited in the present invention.

Optionally, in another embodiment, when the photographing environment is not a negative feedback scenario, a second image collected by the second image sensor may be acquired, and the second image is used as the preview image. Further, when a photographing operation instruction is received, a picture may be generated according to the preview image.

Figure 2:
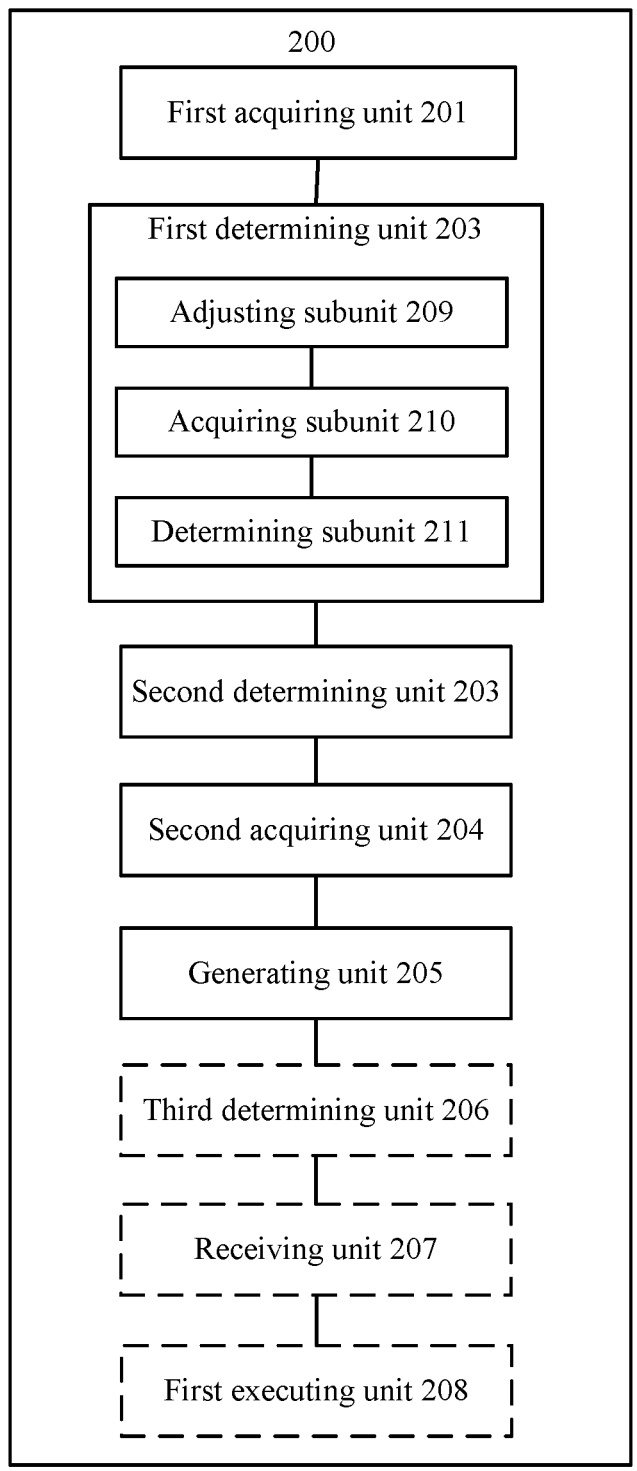
FIG. 2 is a block diagram of a photographing apparatus according to an embodiment of the present invention.

FIG. 2 is a block diagram of a photographing apparatus according to an embodiment of the present invention. A photographing apparatus 200 shown in FIG. 2 includes a first acquiring unit 201, a first determining unit 202, a second determining unit 203, a second acquiring unit 204, and a generating unit 205.

The first acquiring unit 201 is configured to acquire a first image collected by a first image sensor corresponding to a first lens. The first determining unit 202 is configured to identify a scenario of the first image acquired by the first acquiring unit 201 to determine a photographing environment. The second determining unit 203 is configured to determine, according to the photographing environment determined by the first determining unit 202, a second ISP parameter corresponding to a second lens. The second acquiring unit 204 is configured to acquire a second image that is collected, by using the second ISP parameter determined by the second determining unit 203, by a second image sensor corresponding to the second lens. The generating unit 205 is configured to generate a preview image according to the second image acquired by the second acquiring unit 204, where the first lens and the second lens are arranged on a same plane.

According to this embodiment of the present invention, a photographing environment is determined by using an image collected by one lens of a dual-lens device, an ISP parameter corresponding to the other lens is determined according to the determined photographing environment, and then a preview image is generated by using an image collected by the other lens. In such a manner of using two lenses to respectively determining a photographing environment and acquiring a preview image, picture flickering on the preview image can be avoided.

Optionally, in an embodiment, the photographing apparatus 200 shown in FIG. 2 may further include a third determining unit 206, a receiving unit 207, and a first executing unit 208. The third determining unit 206 is configured to determine a photographing algorithm according to the photographing environment determined by the first determining unit 202. The receiving unit 207 is configured to receive a photographing operation instruction. The first executing unit 208 is configured to: when the receiving unit 207 receives the photographing operation instruction, perform processing on the preview image by using the photographing algorithm determined by the third determining unit 206, and generate a picture.

Optionally, in another embodiment, the first determining unit 202 may include an adjusting subunit 209, an acquiring subunit 210, and a determining subunit 211. The adjusting subunit 209 may be configured to: when a difference between an average value of brightness of a center on the first image and an average value of brightness of surrounding of the first image is greater than a first threshold, adjust a first ISP parameter corresponding to the first lens, where the adjusting a first ISP parameter corresponding to the first lens includes prolonging an exposure time of the first lens. The acquiring subunit 210 may be configured to acquire a third image that is collected, by using the first ISP parameter that is obtained after being adjusted by the adjusting subunit 209, by the first image sensor, where the third image is a next-frame image, after the first ISP parameter is adjusted, of the first image. The determining subunit 211 may be configured to determine, according to the first image acquired by the first acquiring unit 201 and the third image acquired by the acquiring subunit 210, whether the photographing environment is a backlit scene.

The determining subunit 211 may be specifically configured to: when a difference between an average value of brightness of a center on the third image and the average value of brightness of the center on the first image is greater than a second threshold, or when a difference between an average value of color saturation of a center on the third image and an average value of color saturation of the center on the first image is greater than a third threshold, determine that the photographing environment is a backlit scene.

Optionally, in another embodiment, the second determining unit 203 may be configured to: when the photographing environment determined by the first determining unit 202 is a backlit scene, prolong an exposure time of the second lens and/or improve film speed of the second lens.

Optionally, in another embodiment, the third determining unit 206 may be configured to: when the photographing environment determined by the first determining unit 202 is a backlit scene, determine the photographing algorithm as a partial contrast ratio algorithm. The receiving unit 207 is configured to receive a photographing operation instruction. The first executing unit 208 may be configured to: when the receiving unit 207 receives the photographing operation instruction, perform processing on the preview image by using the partial contrast ratio algorithm determined by the third determining unit 206 and adjust a parameter of the partial contrast ratio algorithm, and generate a picture.

Optionally, in another embodiment, the second determining unit 203 may be configured to: when the photographing environment determined by the first determining unit 202 is a night scene, prolong an exposure time of the second lens and/or improve film speed of the second lens.

Optionally, in another embodiment, the third determining unit 206 may be configured to: when the photographing environment determined by the first determining unit 202 is a night scene, determine the photographing algorithm as a multiframe denoising algorithm. The receiving unit 207 is configured to receive a photographing operation instruction. The first executing unit 208 may be configured to: when the receiving unit 207 receives the photographing operation instruction, perform processing on the preview image by using the multiframe denoising algorithm determined by the third determining unit 206, and generate a picture.

Optionally, in another embodiment, the photographing apparatus 200 may further include a second executing unit, configured to: when the photographing environment determined by the first determining unit is not a negative feedback scenario, acquire a second image collected by the second image sensor, and use the second image as the preview image; and further, when a photographing operation instruction is received, generate a picture according to the preview image.

The photographing apparatus 200 can implement processes implemented by the dual-lens device in the embodiment shown in FIG. 1, and to avoid repeated description, details are not described herein again.

Figure 3:
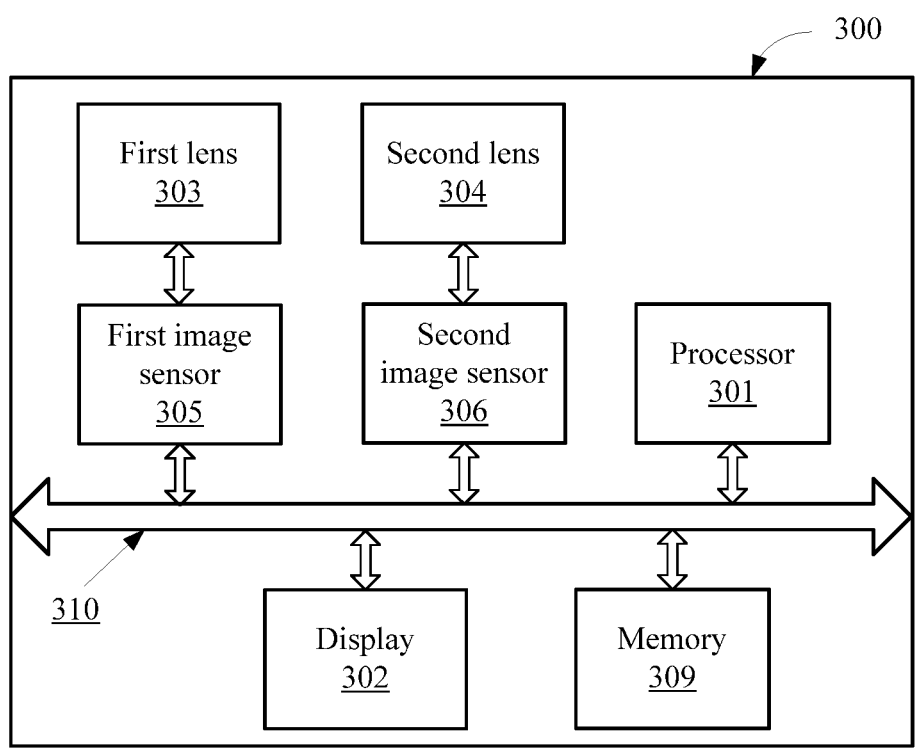
FIG. 3 is a block diagram of a dual-lens device according to an embodiment of the present invention.

FIG. 3 is a block diagram of a dual-lens device according to an embodiment of the present invention. A dual-lens device 300 shown in FIG. 3 includes a processor 301, a display 302, a first lens 303 and a second lens 304 that are arranged on a same plane of the dual-lens device, a first image sensor 305 corresponding to the first lens 303, and a second image sensor 306 corresponding to the second lens 304.

The first image sensor 305 is configured to collect a first image by using the first lens 303. The second image sensor 306 is configured to collect a second image by using the second lens 304. The processor 301 is configured to: acquire the first image collected by the first image sensor 305; identify a scenario of the first image to determine a photographing environment; determine, according to the photographing environment, a second ISP parameter corresponding to the second lens 304; acquire a second image that is collected, by using the second ISP parameter, by the second image sensor 306; and generate a preview image according to the second image. The display 302 is configured to display the preview image generated by the processor 301.

According to this embodiment of the present invention, a photographing environment is determined by using an image collected by one lens of a dual-lens device, an ISP parameter corresponding to the other lens is determined according to the determined photographing environment, and then a preview image is generated by using an image collected by the other lens. In such a manner of using two lenses to respectively determining a photographing environment and acquiring a preview image, picture flickering on the preview image can be avoided.

Components in the dual-lens device 300 are coupled together by using a bus system 310, where the bus system 310 includes, in addition to a data bus, a power bus, a control bus, and status signal bus. However, for clarity of description, various buses are marked as the bus system 310 in FIG. 3.

Optionally, in an embodiment, the processor 301 may further be configured to: determine a photographing algorithm according to the photographing environment; and perform processing on the preview image by using the photographing algorithm and generate a picture, when a photographing operation instruction is received.

Optionally, in another embodiment, the processor 301 may be configured to: when a difference between an average value of brightness of a center on the first image and an average value of brightness of surrounding of the first image is greater than a first threshold, adjust a first ISP parameter corresponding to the first lens 303, where the adjusting a first ISP parameter corresponding to the first lens 303 includes prolonging an exposure time of the first lens; acquire a third image collected by the first image sensor 305, where the third image is a next-frame image, after the first ISP parameter is adjusted, of the first image; and determine, according to the first image and the third image, whether the photographing environment is a backlit scene.

Specifically, when a difference between an average value of brightness of a center on the third image and the average value of brightness of the center on the first image is greater than a second threshold, or when a difference between an average value of color saturation of a center on the third image and an average value of color saturation of the center on the first image is greater than a third threshold, it may be determined that the photographing environment is a backlit scene.

In this way, mistaken detection of a backlit scene can be avoided by comparing the first image and the third image.

Optionally, in another embodiment, the processor 301 may be configured to: when the photographing environment is a backlit scene, prolong an exposure time of the second lens 304 and/or improve film speed of the second lens 304.

Optionally, in another embodiment, the processor 301 may further be configured to: when the photographing environment is a backlit scene, determine the photographing algorithm as a partial contrast ratio algorithm; and when the photographing operation instruction is received, perform processing on the preview image by using the partial contrast ratio algorithm and adjust a parameter of the partial contrast ratio algorithm, and generate a picture.

Optionally, in another embodiment, the processor 301 may be configured to: when the photographing environment is a night scene, prolong an exposure time of the second lens 304 and/or improve film speed of the second lens 304.

Optionally, in another embodiment, the processor 301 may further be configured to: when the photographing environment is a night scene, determine the photographing algorithm as a multiframe denoising algorithm; and when the photographing operation instruction is received, perform processing on the preview image by using the multiframe denoising algorithm, and generate a picture.

Optionally, in another embodiment, the processor 301 may further be configured to: when the photographing environment is not a negative feedback scenario, acquire a second image collected by the second image sensor 306, and use the second image as the preview image; and when a photographing operation instruction is received, generate a picture according to the preview image.

In this embodiment of the present invention, the processor 301 may be a central processing unit (CPU), or the processor 301 may be an image signal processor (ISP).

In another embodiment of the present invention, the processor 301 may include a CPU and an ISP. The ISP may include a first ISP and a second ISP, where the first ISP is corresponding to a first lens, and the second ISP is corresponding to a second lens. Accordingly, a first ISP parameter corresponding to the first lens may be an ISP parameter of the first ISP, and a second ISP parameter corresponding to the second lens may be an ISP parameter of the second ISP. Alternatively, the ISP may have two units that are respectively corresponding to the first lens and the second lens.

Specifically, after the CPU determines the first ISP parameter corresponding to the first lens, the first ISP may adjust a parameter of the first ISP to be the first ISP parameter, or the ISP adjusts a parameter of a unit corresponding to the first lens to be the first ISP parameter. In this way, quality of an image collected by the first lens may be adjusted by adjusting the parameter of the first ISP or the parameter of the unit corresponding to the first lens.

After the CPU determines the second ISP parameter corresponding to the second lens, the second ISP may adjust a parameter of the second ISP to be the second ISP parameter, or the ISP adjusts a parameter of a unit corresponding to the second lens to be the second ISP parameter. In this way, quality of an image collected by the second lens may be adjusted by adjusting the parameter of the second ISP or the parameter of the unit corresponding to the second lens.

In this embodiment of the present invention, the processor 301 may be corresponding to the photographing apparatus 200 shown in FIG. 2.

The method disclosed in the embodiments of the present invention may be applied to the processor 301, or is implemented by the processor 301. The processor 301 may be an integrated circuit chip, which has a signal processing capability. During an implementation process, the steps in the foregoing method may be completed by using an integrated logic circuit of hardware in the processor 301 or an instruction in software form. The foregoing processor 301 may be a general purpose processor, a digital signal processor (DSP), an application specific integrated circuit (ASIC), a field programmable gate array (FPGA) or another programmable logic device, a discrete gate or a transistor logic device, or a discrete hardware component, which may implement or perform the disclosed methods, steps, and logical block diagrams in the embodiments of the present invention. The general purpose processor may be a microprocessor or the processor may be any conventional processor, or the like. The steps of the method disclosed in the embodiments of the present invention may be directly executed by a hardware decoding processor, or executed by a combination of hardware and software modules in a decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory 309. The processor 301 reads information from the memory 309, and completes the steps of the foregoing method in combination with the hardware of the processor 301.

Although the display 302 is described as a part of the dual-lens device 300 in FIG. 3, the embodiments of the present invention impose no limitation on a location of the display 302. For example, the display 302 may be an external display that is connected to the dual-lens device 300 through an image interface, so as to display an image acquired by the dual-lens device 300. In addition, the display 302 may present an image to a user by using various technologies, such as a liquid crystal array, a plasma unit, and a cathode-ray tube; the embodiments of the present invention impose no limitation on an implementation manner of the display 302.

It should be noted that, the display 302 may also be a touchscreen, where the touchscreen may receive an input operation of a user. The photographing operation instruction received by the processor 301 may be transferred from other hardware of the dual-lens device 300, or may be preset by internal software of the processor 301, which is not limited in the present invention. The foregoing other hardware of the dual-lens device 300 may be a particular button, or may be the foregoing display 302 with a touch function. For example, a photographing operation may be pressing a particular button by a user, or tapping a particular position on the display 302 by a user. A photographing operation performed by the user may be transmitted through a pressure sensor to the processor 301, so that the processor 301 receives a photographing operation instruction.

The processor 301 in the dual-lens device 300 can implement processes implemented by the dual-lens device in the embodiment shown in FIG. 1, and to avoid repeated description, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of the present invention. The foregoing storage medium includes: any medium that can store program code, such as a universal serial bus (USB) flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A photographing method for a dual-lens device, comprising:
   acquiring a first image collected by a first image sensor corresponding to a first lens, wherein the dual-lens device comprises the first lens and a second lens arranged on a same plane;
   identifying a scenario of the first image to determine a photographing environment;
   determining, according to the photographing environment, a second image signal processor (ISP) parameter corresponding to the second lens;
   acquiring a second image that is collected, according to the second ISP parameter, by a second image sensor corresponding to the second lens; and
   generating a preview image according to the second image.

2. The photographing method according to claim 1, wherein the photographing method further comprises:
   determining a photographing algorithm according to the photographing environment; and
   performing processing on the preview image by using the photographing algorithm and generating a picture, in response to a photographing operation instruction being received.

3. The photographing method according to claim 2, wherein the determining a photographing algorithm according to the photographing environment comprises:
   determining the photographing algorithm to include a partial contrast ratio algorithm in response to the photographing environment being a backlit scene; and
   wherein the performing processing on the preview image by using the photographing algorithm and generating a picture in response to the photographing operation instruction being received comprises:
   performing, in response to the photographing operation instruction being received, processing on the preview image by using the partial contrast ratio algorithm and adjusting a parameter of the partial contrast ratio algorithm, and generating the picture.

4. The photographing method according to claim 1, wherein the determining the photographing algorithm according to the photographing environment comprises:
   determining in response to the photographing environment being a night scene, the photographing algorithm to include a multiframe denoising algorithm; and
   wherein the performing processing on the preview image by using the photographing algorithm and generating the picture in response to the photographing operation instruction being received comprises:
      performing, in response to the photographing operation instruction being received, processing on the preview image by using the multiframe denoising algorithm, and generating the picture.

5. The photographing method according to claim 1, wherein the identifying the scenario of the first image to determine the photographing environment comprises:
   adjusting a first ISP parameter corresponding to the first lens in response to a difference between an average value of brightness of a center on the first image and an average value of brightness of a surrounding area of the first image being greater than a first threshold, wherein the adjusting the first ISP parameter corresponding to the first lens comprises prolonging an exposure time of the first lens;
   acquiring a third image that is collected, according to the first ISP parameter by the first image sensor, wherein the third image is a next-frame image, after the first ISP parameter is adjusted, of the first image; and
   determining, according to the first image and the third image, whether the photographing environment is a backlit scene.

6. The photographing method according to claim 5, wherein the determining, according to the first image and the third image, whether the photographing environment is the backlit scene comprises:
   determining that the photographing environment is a backlit scene in response to at least one of a difference between an average value of brightness of a center on the third image and the average value of brightness of the center on the first image being greater than a second threshold, or a difference between an average value of color saturation of the center on the third image and an average value of color saturation of the center on the first image being greater than a third threshold.

7. The photographing method according to claim 1, wherein the determining, according to the photographing environment, the second ISP parameter corresponding to the second lens comprises:
   performing, in response to the photographing environment being a backlit scene, at least one of prolonging an exposure time of the second lens and improving film speed of the second lens.

8. The photographing method according to claim 1, wherein the determining, according to the photographing environment, the second ISP parameter corresponding to the second lens comprises:
   performing, in response to the photographing environment being a night scene, at least one of prolonging an exposure time of the second lens and improving film speed of the second lens.

9. The photographing method according to claim 1, further comprising:
   acquiring a second image collected by the second image sensor in response to the photographing environment not being a negative feedback scenario, and using the second image as the preview image; and
   generating a picture according to the preview image in response to the photographing operation instruction being received.

10. A dual-lens device, comprising:
    a processor;
    a display connected to the processor;
    a first lens;
    a second lens are arranged on a same plane as the first lens;
    a first image sensor corresponding to the first lens and connected to the processor; and
    a second image sensor corresponding to the second lens and connected to the processor;
    wherein the first image sensor is configured to collect a first image by using the first lens;
    wherein the second image sensor is configured to collect a second image by using the second lens;
    wherein the processor is configured to:
       acquire the first image collected by the first image sensor; identify a scenario of the first image to determine a photographing environment;
       determine, according to the photographing environment, a second image signal processor (ISP) parameter corresponding to the second lens;
       further acquire a second image that is collected, by using the second ISP parameter, by the second image sensor corresponding to the second lens; and generate a preview image according to the second image; and wherein the display is configured to display the preview image generated by the processor.

11. The dual-lens device according to claim 10, wherein the processor is further configured to:

determine a photographing algorithm according to the photographing environment; and perform processing on the preview image by using the photographing algorithm and generate a picture in response to a photographing operation instruction being received.

12. The dual-lens device according to claim 11, wherein the processor is further configured to:

determine the photographing algorithm to include a partial contrast ratio algorithm in response to the photographing environment being a backlit scene,; and perform, in response to the photographing operation instruction being received, processing on the preview image by using the partial contrast ratio algorithm and adjust a parameter of the partial contrast ratio algorithm, and generate a picture.

13. The dual-lens device according to claim 11, wherein the processor is further configured to:

determine, in response to the photographing environment being a night scene, the photographing algorithm to include a multiframe denoising algorithm; and perform, in response to the photographing operation instruction being received, processing on the preview image by using the multiframe denoising algorithm, and generate the picture.

14. The dual-lens device according to claim 10, wherein the processor is configured to:

adjust a first ISP parameter corresponding to the first lens, in response to a difference between an average value of brightness of a center on the first image and an average value of brightness of a surrounding area of the first image being greater than a first threshold, wherein the adjusting a first ISP parameter corresponding to the first lens comprises prolonging an exposure time of the first lens;

acquire a third image that is collected, according to the first ISP parameter, by the first image sensor, wherein the third image is a next-frame image, after the first ISP parameter is adjusted, of the first image; and determine, according to the first image and the third image, whether the photographing environment is a backlit scene.

15. The dual-lens device according to claim 14, wherein the processor is configured to:

determine that the photographing environment is a backlit scene in response to at least one of a difference between an average value of brightness of a center on the third image and the average value of brightness of the center on the first image is greater than a second threshold, or a difference between an average value of color saturation of the center on the third image and an average value of color saturation of the center on the first image is greater than a third threshold.

16. The dual-lens device according to claim 10, wherein the processor is configured to, in response to the photographing environment being a backlit scene, perform at least one of prolong an exposure time of the second lens and improve film speed of the second lens.

17. The dual-lens device according to claim 10, wherein the processor is configured to,: in response to the photographing environment being a night scene, perform at least one of prolong an exposure time of the second lens and improve film speed of the second lens.

18. The dual-lens device according to claim 10, wherein the processor is further configured to:

acquire, in response to the photographing environment not being a negative feedback scenario, a second image collected by the second image sensor, and use the second image as the preview image; and generate a picture according to the preview image in response to the photographing operation instruction being received.

19. The dual-lens device according to claim 10, wherein the processor is at least one of a first central processing unit (CPU) a first image signal processor (ISP).

20. The dual-lens device according to claim 10, wherein the processor comprises a second CPU and a second ISP.

* * * * *